US012691666B2

(12) United States Patent　　(10) Patent No.:　US 12,691,666 B2
Goertzen et al.　　(45) Date of Patent:　　Jul. 28, 2026

(54) DIELECTRIC INSULATION FILM

(71) Applicant: Schlumberger Technology Corporation, Sugar Land, TX (US)

(72) Inventors: William Goertzen, Lawrence, KS (US); Varun Vinaykumar Nyayadhish, Nisku (CA); Jason Holzmueller, Lawrence, KS (US); Shuaishuai Lambkin, Lawrence, KS (US)

(73) Assignee: Schlumberger Technology Corporation, Sugar Land, TX (US)

( * ) Notice: Subject to any disclaimer, the term of this patent is extended or adjusted under 35 U.S.C. 154(b) by 193 days.

(21) Appl. No.: 18/693,389

(22) PCT Filed: Oct. 14, 2022

(86) PCT No.: PCT/US2022/046739
　§ 371 (c)(1),
　(2) Date: Mar. 19, 2024

(87) PCT Pub. No.: WO2023/064573
　PCT Pub. Date: Apr. 20, 2023

(65) Prior Publication Data
　US 2024/0391226 A1　　Nov. 28, 2024

Related U.S. Application Data

(60) Provisional application No. 63/256,370, filed on Oct. 15, 2021.

(51) Int. Cl.
　B32B 27/12　　(2006.01)
　B32B 3/04　　(2006.01)
　　(Continued)

(52) U.S. Cl.
　CPC ................ B32B 27/12 (2013.01); B32B 3/04 (2013.01); B32B 5/02 (2013.01); B32B 17/10 (2013.01);
　　(Continued)

(58) Field of Classification Search
　CPC .. B32B 27/12; B32B 3/04; B32B 5/02; B32B 17/10; B32B 27/20; B32B 27/281;
　　(Continued)

(56) References Cited

U.S. PATENT DOCUMENTS

2003/0219588 A1*　11/2003　Ogawa ................... H05K 1/034
　　　　　428/209
2005/0013998 A1　　1/2005　Lacourt
　　(Continued)

FOREIGN PATENT DOCUMENTS

CN　　110077055 A　　8/2019
WO　　2016032469 A1　　3/2016
WO　　2016032511 A1　　3/2016

OTHER PUBLICATIONS

International Search Report and Written Opinion issued in International Patent Appl. No. PCT/US2022/046739 on Feb. 21, 2023; 10 pages.

*Primary Examiner* — Betelhem Shewareged
(74) *Attorney, Agent, or Firm* — Kyle R. Miiller

(57) ABSTRACT

Dielectric films are provided. Such films can be used in electric submersible pump stators, for example, as slot liners, phase barriers, or housing barriers. The film includes a polymeric matrix combined with an inorganic filler or reinforcing system.

16 Claims, 4 Drawing Sheets

(51) Int. Cl.

| | |
|---|---|
| *B32B 5/02* | (2006.01) |
| *B32B 17/10* | (2006.01) |
| *B32B 27/20* | (2006.01) |
| *B32B 27/28* | (2006.01) |
| *B32B 27/32* | (2006.01) |
| *B32B 37/18* | (2006.01) |

(52) U.S. Cl.
CPC ............ *B32B 27/20* (2013.01); *B32B 27/281* (2013.01); *B32B 27/322* (2013.01); *B32B 37/185* (2013.01); *B32B 2250/40* (2013.01); *B32B 2307/202* (2013.01); *B32B 2307/204* (2013.01); *B32B 2307/54* (2013.01)

(58) Field of Classification Search
CPC . B32B 27/322; B32B 37/185; B32B 2250/40; B32B 2307/202; B32B 2307/204; B32B 2307/54
USPC .......................................................... 428/74
See application file for complete search history.

(56) References Cited

U.S. PATENT DOCUMENTS

| | | | | |
|---|---|---|---|---|
| 2009/0317264 A1* | 12/2009 | Manke | .................... | F04B 47/06 |
| | | | | 417/423.3 |
| 2010/0032192 A1 | 2/2010 | Kishi | | |
| 2010/0156215 A1 | 6/2010 | Goertzen et al. | | |
| 2017/0244294 A1* | 8/2017 | Holzmueller | .......... | H02K 5/132 |
| 2018/0041086 A1* | 2/2018 | Madbouly | .............. | E21B 47/07 |
| 2020/0270413 A1 | 8/2020 | Koes et al. | | |
| 2024/0391226 A1* | 11/2024 | Goertzen | ............... | B32B 27/16 |
| 2024/0396396 A1* | 11/2024 | Goertzen | ............... | H02K 15/12 |

* cited by examiner

780

781

783

792
783

791
782

793  793

DIELECTRIC INSULATION FILM

CROSS-REFERENCE TO RELATED APPLICATIONS

The present application is a National Stage Entry of International Application No. PCT/US2022/046739, filed Oct. 14, 2022, which claims priority benefit of U.S. Provisional Application No. 63/256,370, filed Oct. 15, 2021, the entirety of which is incorporated by reference herein and should be considered part of this specification.

BACKGROUND

Field

The present disclosure generally relates to a dielectric insulation film, for example for use in electric submersible pumps.

Description of the Related Art

Various types of artificial lift equipment and methods are available, for example, electric submersible pumps (ESPs). An ESP includes multiple centrifugal pump stages mounted in series, each stage including a rotating impeller and a stationary diffuser mounted on a shaft, which is coupled to a motor. In use, the motor rotates the shaft, which in turn rotates the impellers within the diffusers. Well fluid flows into the lowest stage and passes through the first impeller, which centrifuges the fluid radially outward such that the fluid gains energy in the form of velocity. Upon exiting the impeller, the fluid flows into the associated diffuser, where fluid velocity is converted to pressure. As the fluid moves through the pump stages, the fluid incrementally gains pressure until the fluid has sufficient energy to travel to the well surface.

SUMMARY

In some configurations, a dielectric film includes a polymeric matrix; and an inorganic, thermally conductive filler.

The polymeric matrix can be in the form of a sheet permanently bonded to a second sheet comprising a reinforcing fabric. The filler can be present in an amount exceeding 15% total volume. The filler can include one or more mineral or ceramic fillers. The polymer matrix can include one or more of PTFE, PFA, and polyimide PEEK. The film can further include a surface treatment configured to improve compatibility with thermoset resin encapsulant of an electric submersible pump motor stator.

The film can include a plurality of thin layers. The film can include at least one outer layer and at least one inner layer. The at least one outer layer can include water resistant PTFE or PFA composite. The at least one outer layer can include a low modulus, high elongation film. The inner layer(s) can include a high dielectric strength polyimide or polyimide composite. The plurality of layers may not be physically or chemically bonded together prior to insertion into a stator for an electric submersible pump. The layers can be locked in the stator during encapsulation of the stator with a rigid thermoset resin.

In some configurations, a method of making a dielectric film can include sandwiching one or more inner layers of a first material with one or more outer layers of a second material. The inner and outer layers may not be physically or chemically bonded together prior to insertion into a stator.

The method can further include inserting the film into a stator, and encapsulating the stator with a rigid thermoset resin, thereby mechanically locking the inner and outer layers in place.

In some configurations, a method of making a dielectric film can include incorporating an inorganic filler into a polymeric matrix. The filler can be incorporated into the polymeric matrix in an amount exceeding 15% total volume. In some configurations, a method of making a dielectric film can include permanently bonding a sheet of a polymer to a sheet of a glass or mica fabric.

The method can further include applying a surface treatment to the film, the surface treatment configured to improve compatibility with a thermoset resin encapsulant of an electric submersible pump motor stator.

BRIEF DESCRIPTION OF THE FIGURES

Certain embodiments, features, aspects, and advantages of the disclosure will hereafter be described with reference to the accompanying drawings, wherein like reference numerals denote like elements. It should be understood that the accompanying figures illustrate the various implementations described herein and are not meant to limit the scope of various technologies described herein.

DETAILED DESCRIPTION

In the following description, numerous details are set forth to provide an understanding of some embodiments of the present disclosure. It is to be understood that the following disclosure provides many different embodiments, or examples, for implementing different features of various embodiments. Specific examples of components and arrangements are described below to simplify the disclosure. These are, of course, merely examples and are not intended to be limiting. However, it will be understood by those of ordinary skill in the art that the system and/or methodology may be practiced without these details and that numerous variations or modifications from the described embodiments are possible. This description is not to be taken in a limiting sense, but rather made merely for the purpose of describing general principles of the implementations. The scope of the described implementations should be ascertained with reference to the issued claims.

As used herein, the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down"; "upper" and "lower"; "top" and "bottom"; and other like terms indicating relative positions to a given point or element are utilized to more clearly describe some elements. Commonly, these terms relate to a reference point at the surface from which drilling operations are initiated as being the top point and the total depth being the lowest point, wherein the well (e.g., wellbore, borehole) is vertical, horizontal or slanted relative to the surface.

Figure 1:
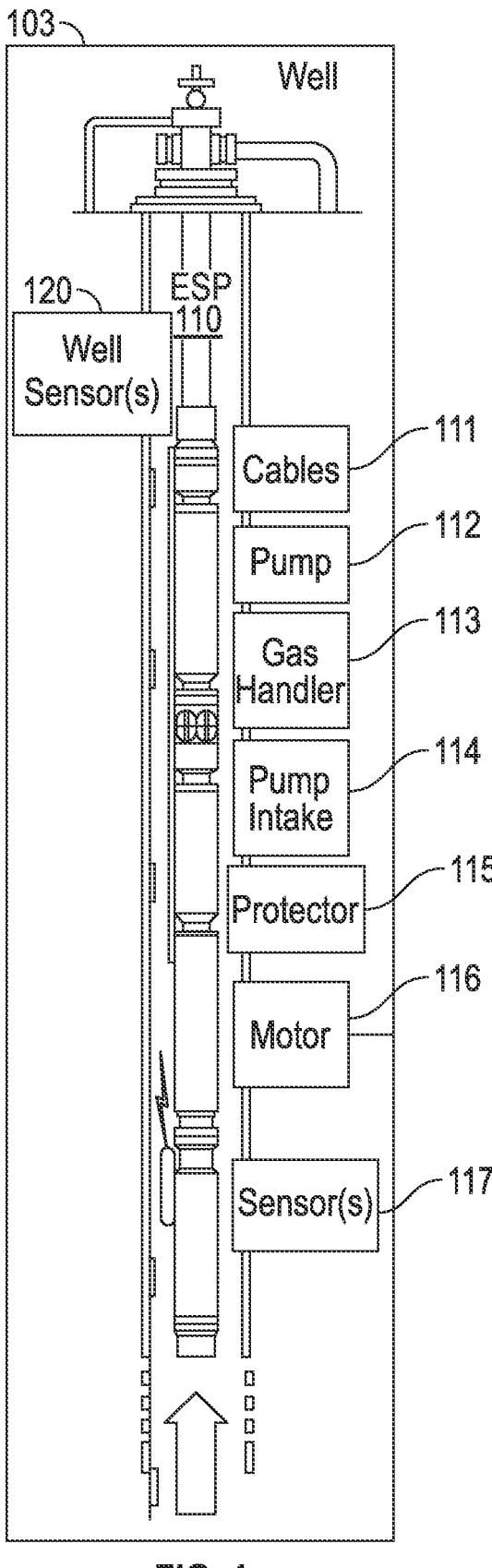
FIG. 1 shows a schematic of an electric submersible pump (ESP) system.

Various types of artificial lift equipment and methods are available, for example, electric submersible pumps (ESP). As shown in the example embodiment of FIG. 1, an ESP 110 typically includes a motor 116, a protector 115, a pump 112, a pump intake 114, and one or more cables 111, which can include an electric power cable. The motor 116 can be powered and controlled by a surface power supply and controller, respectively, via the cables 111. In some configurations, the ESP 110 also includes gas handling features 113 and/or one or more sensors 117 (e.g., for temperature, pressure, current leakage, vibration, etc.). As shown, the well 103 may include one or more well sensors 120.

The pump 112 includes multiple centrifugal pump stages mounted in series within a housing. Each stage includes a rotating impeller and a stationary diffuser. A shaft extends through the pump (e.g., through central hubs or bores of the impellers and diffusers) and is operatively coupled to the motor 116. The shaft can be coupled to the protector 115 (e.g., a shaft of the protector), which in turn can be coupled to the motor 116 (e.g., a shaft of the motor). The impellers are rotationally coupled, e.g., keyed, to the shaft. The diffusers are coupled, e.g., rotationally fixed, to the housing. In use, the motor 116 causes rotation of the shaft (for example, by rotating the protector 115 shaft, which rotates the pump shaft), which in turn rotates the impellers relative to and within the stationary diffusers.

In use, well fluid flows into the first (lowest) stage of the ESP 110 and passes through an impeller, which centrifuges the fluid radially outward such that the fluid gains energy in the form of velocity. Upon exiting the impeller, the fluid makes a sharp turn to enter a diffuser, where the fluid's velocity is converted to pressure. The fluid then enters the next impeller and diffuser stage to repeat the process. As the fluid passes through the pump stages, the fluid incrementally gains pressure until the fluid has sufficient energy to travel to the well surface.

Figure 2:
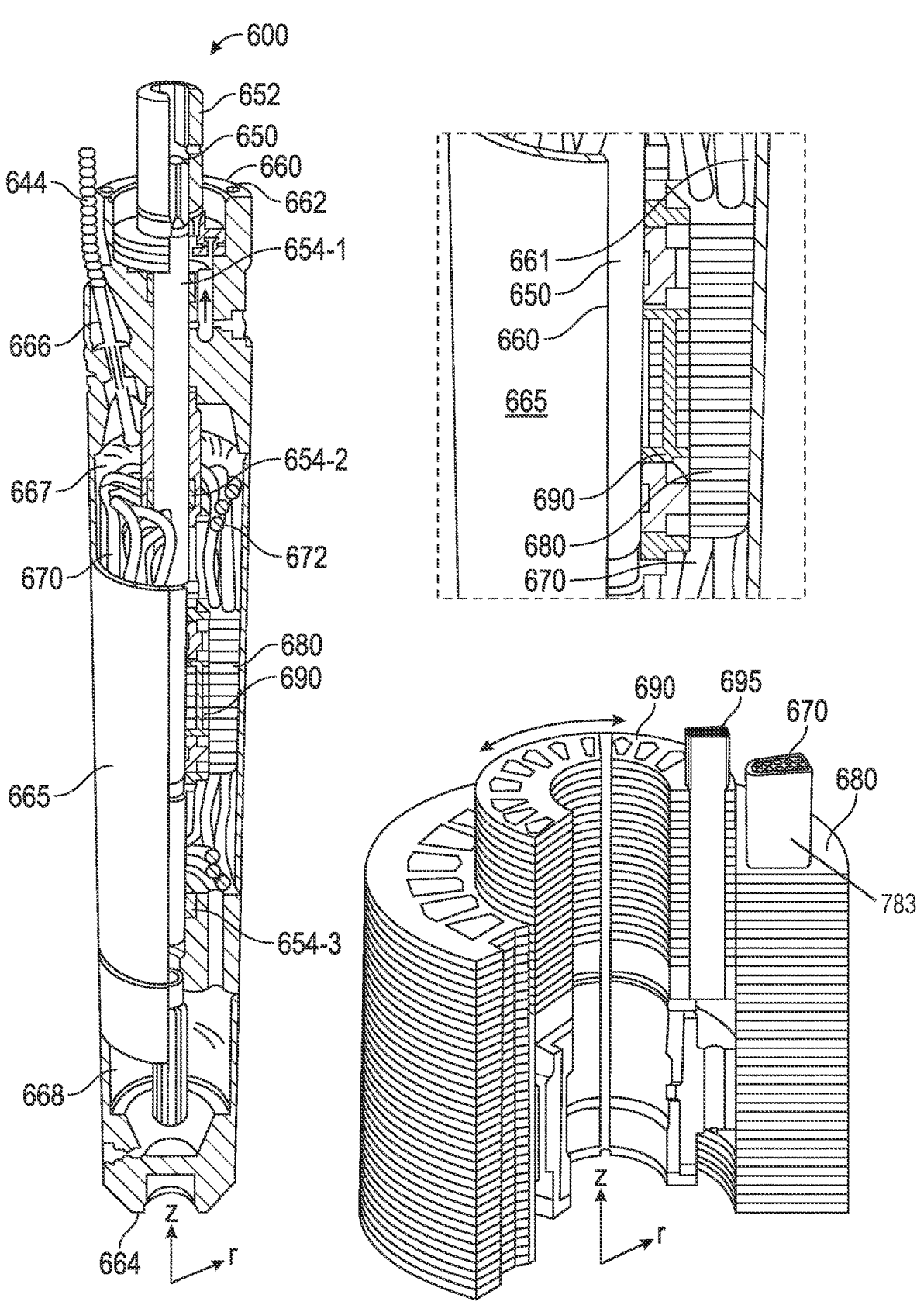
FIG. 2 shows a perspective cut-away view of an example of a motor assembly.

FIG. 2 shows a perspective cut-away view of an example motor assembly 600. As shown, the motor assembly 600 can include a power cable 644 (e.g., MLEs, etc.) to supply energy, a shaft 650, a housing 660 that may be made of multiple components (e.g., multiple units joined to form the housing 660), stacked laminations 680, stator windings 670 of wire (e.g., magnet wire), and rotor laminations 690 and rotor windings 695 coupled to the shaft 650 (e.g., rotatably driven by energizing the stator windings 670).

As shown in FIG. 2, the housing 660 includes an inner surface 661 and an outer surface 665. The housing 660 can define one or more cavities via its inner surface 661. One or more of the cavities may be hermetically sealed. Such a cavity may be filled at least partially with dielectric oil. The dielectric oil may be formulated to have a desired viscosity and/or viscoelastic properties, etc.

As shown, the shaft 650 may be fitted with a coupling 652 to couple the shaft to another shaft. A coupling may include, for example, splines that engage splines of one or more shafts. The shaft 650 may be supported by bearings 654-1, 654-2, 654-3, etc. disposed in the housing 660. The shaft may be reciprocating, for example, where a shaft includes one or more magnets (e.g., permanent magnets) that respond to current that passes through stator windings.

As shown, the housing 660 includes opposing axial ends 662 and 664 with the substantially cylindrical outer surface 665 extending therebetween. The outer surface 665 can include one or more sealable openings for passage of oil (e.g., dielectric oil), for example, to lubricate the bearings and to protect various components of the motor assembly 600. In some configurations, the motor assembly 600 may include one or more sealable cavities. For example, a passage 666 allows for passage of one or more conductors of the cable 644 (e.g., or cables) to a motor cavity 667 of the motor assembly 600 where the motor cavity 667 may be a sealable cavity. As shown, the motor cavity 667 houses the stator windings 670 and the stator laminations 680. In some configurations, an individual winding may include a plurality of conductors (e.g., magnet wires). For example, a cross-section 672 of an individual winding may reveal a plurality of conductors that are disposed in a matrix (e.g., of material or materials) or otherwise bound together (e.g., by a material or materials). In the example of FIG. 2, the motor housing 660 includes an oil reservoir 668, for example, that may include one or more passages (e.g., a sealable external passage and a passage to the motor cavity 667) for passage of oil.

In some configurations, a polymeric matrix may be formed of organic and/or inorganic monomeric and/or polymeric materials. For example, one or more of an epoxy, bismaleimide, polybutadiene, benzoxazine, cyanate ester, silicone, Ring-Opening Metathesis Polymers (ROMP), and preceramic polymers may be utilized. One or more monomers and/or polymers may be amphiphilic, which may facilitate blending in one or more fillers. For example, the functionalized linseed oil marketed as DILULIN™ material (Cargill, Inc., Wayzata, Minnesota) is amphiphilic and can allow for increasing content of one or more inorganic fillers of a composite material. Where DILULIN™ material is mentioned, a functionalized linseed oil other than that marketed as DILULIN™ may optionally be utilized.

In some configurations, a polymeric material can be thermally conductive and electrically insulative and be utilized to encapsulate windings of an electric motor. Such an approach may provide for lower winding temperatures and end coil temperatures through heat dissipation.

An electric motor may include a coil retention system such as, for example, a full winding encapsulation type, a varnished windings type, or an end coil retention type (e.g., one that does not support wires in slots). In some configurations, a glass-fiber tape can be included in a coil retention system where, for example, the glass-fiber tape is wrapped around end turns and where the glass-fiber tape is impregnated with a crosslinking resin.

An encapsulation technique can depend on the type of coil retention system employed. For example, the use of a thermosetting polymer can depend on the type of coil retention system. An encapsulated system can involve use of one or more materials and one or more particular processes. As an example, a varnished windings approach can include use of a solvent-based polybutadiene system, which tends to be more elastomeric than structural. An end coil retention resin can be a silica-filled epoxy, which has suitable structural properties due in part to the fact that the end coil retention provides coil stabilization while holding the end turns and while not supporting wires in the slots.

To maintain mechanical robustness of magnet wire wrapped in a stator of an electric motor, insulated motor windings may use a coil retention system where at least ends of coils are held in place by a structural composite that includes fibrous reinforcement (e.g., one or more of glass, quartz, aramid, etc.) and an organic and/or inorganic polymer matrix.

Dielectric fluids (e.g., motor oils, etc.), can include, for example, one or more of purified mineral oils, polyalphaolefin (PAO) synthetic oils, PFPE (polyperfluoroether), etc. Such dielectric fluids can be relatively resistant to well fluid(s), which can thereby allow an electric motor to function in case of leakage of well fluid.

Figure 3:
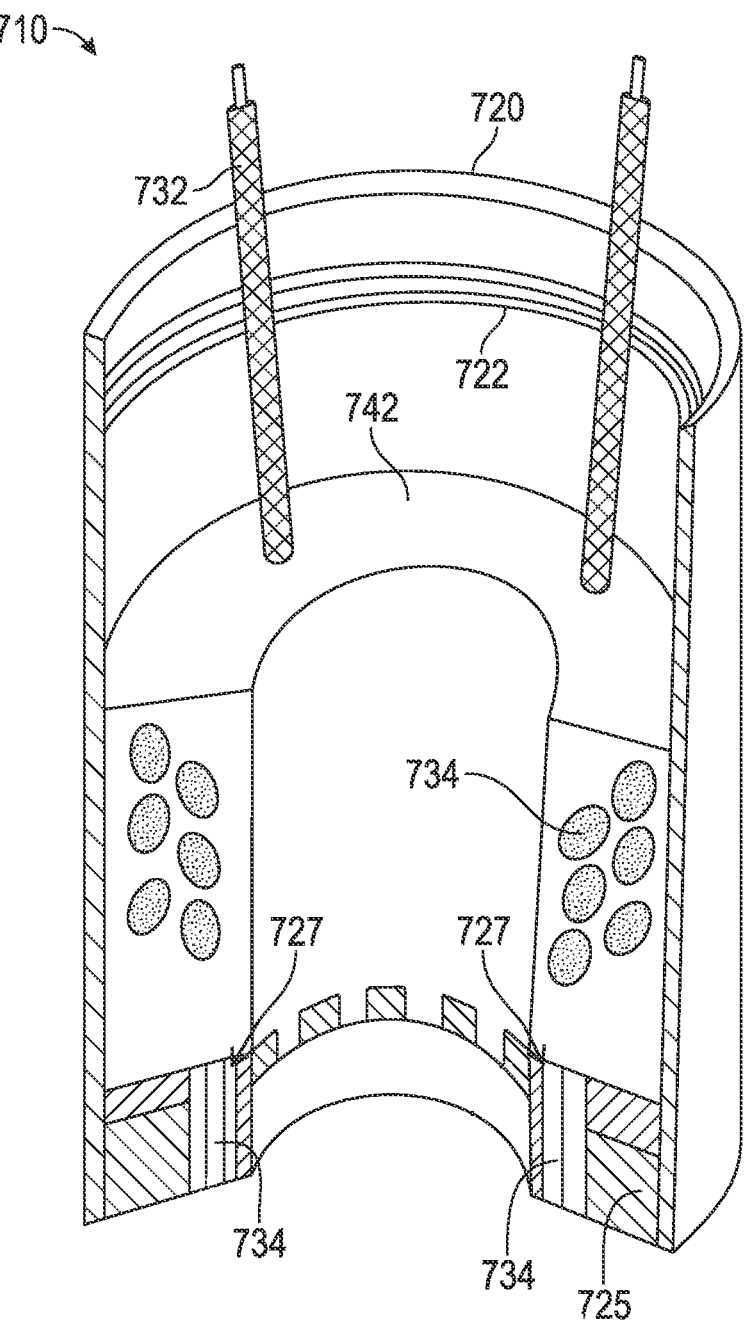
FIG. 3 shows an example electric motor.

As shown in FIG. 3, an electric motor 710 includes a housing 720 with threads 722. Lead wires (e.g., brush wires) 732 are shown where a number of such wires can correspond to a number of phases. For example, for a three phase electric motor, there can be three lead wires 732 (e.g., two being shown in the cutaway view). The lead wires 732 can be associated with a top or uphole end of an electric motor; whereas, at a bottom or downhole end, a wye point may exist where phases are electrically coupled. As an example, a wye point may be electrically coupled to one or more other components such as, for example, a gauge (e.g., a sensor unit, etc.).

As shown in the example of FIG. 3, the lead wires 732 are electrically coupled to phase windings or phase coils 734 in the end turns area. In the end turns area, the windings or coils 734 can extend or be coiled generally circumferentially. The windings or coils 734 can extend from the end turns axially downward through slots 727 in stator laminations 725. As shown in the example of FIG. 3, a polymeric material 742, which may optionally be a polymeric composite material (e.g., polymeric material that includes one or more fillers), contacts the ends of the windings or coils 734. In other words, the polymeric material 742 can surround or encapsulate the windings or coils 734 in the end turns area. A portion of the polymeric material 742 can extend downwardly through the slots 727 in the laminations 725.

In the example of FIG. 3, a molding insert may be utilized to contain the polymeric material 742 (e.g. encapsulant material) during curing of the polymeric material (e.g., where reactions occur involving at least in part monomers, etc.).

In some configurations, a method can include an injection process for injecting the polymeric material 742 into a cavity of the housing 720 to contact ends of windings or coils 734 (e.g., of magnet wire), a molding process for molding the polymeric material 742 about the ends of the windings or coils in a manner to not interfere with other components of an electric motor (e.g., to create a shaft space and/or rotor space, etc.), an assembly process for assembling an electric motor 710 that includes the stator disposed in the housing 720, an assembly process for assembly of a downhole tool that can utilize the electric motor 710 (e.g., an ESP, etc.), or any one or combination of the aforementioned processes.

Figures 4, 5:
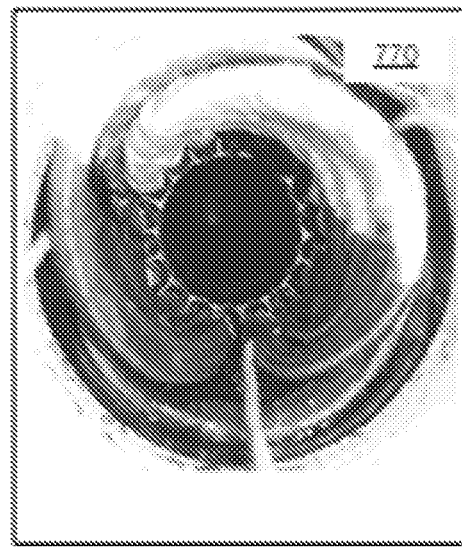
FIG. 4 shows a photograph of a portion of an electric motor.
FIG. 5 shows a portion of an electric motor.

FIG. 4 shows a photograph 770 of a portion of an electric motor where resin is applied to glass fabric for the lower portion of the windings shown in the photograph 770 (e.g., upper portion shows the glass fabric without the resin). As an example, windings can be held in place by a polymeric material (e.g., optionally a polymeric composite material) that completely encapsulates end turns and that fills slots. In such an example, air voids may be substantially removed through use of vacuum impregnation and degassing while prepolymer is heated to a low viscosity prior to gelation.

Thermally conductive encapsulants can improve reliability of ESP systems by decreasing motor winding temperatures. Applications can include SAGD, subsea, geothermal, etc. Such materials may be suitable for use in equipment for drilling and measurement operations (e.g., D&M).

FIG. 5 shows a photograph 780 of an example of a portion of a product (e.g., a portion of an example of a stator). In particular, the photograph 780 shows a lamination 781 that includes a slot 782 where slot liner material 783 defines an interior space such that the slot liner material 783 surrounds magnet wire 792 that includes insulation 791. As shown in the photograph 780, polymeric material 793, which may be polymeric composite material, is disposed exteriorly and interiorly with respect to the slot liner material 783. In some configurations, the insulation 791 can be of the order of about 0.1 mm to about 0.3 mm. The slot liner material 783 can be a polymeric film that may be of one or more layers where a layer of the film may be of the order of about 0.1 mm to about 0.3 mm. As shown, the polymeric material 793 can at least partially fill spaces defined by the slot 782 of the lamination 781. In some configurations, an individual plate may be formed of carbon steel with an oxide coating, and a plurality of such plates can be stacked to form the laminations 781.

As an example, heat energy generated during operation of an electric motor that includes the stator of the photograph 780 may be transferred to the polymeric material 793. For example, current in the magnet wire 792 can generate heat due at least in part to resistance of the magnet wire 792. As the polymeric material 793 is in contact with the magnet wire 792 (e.g., via the electrical insulation 791) it can conduct at least a portion of the heat energy away from the magnet wire 792, noting that resistance of the magnet wire 792 may depend on temperature (e.g., consider a wire where resistance increases with temperature or, in other words, where the wire becomes less efficient as temperature increases).

ESPs for geothermal applications have particularly demanding requirements, e.g., high bottom hole temperature, hot water, high voltage/amperage, and high reliability requirements. A critical element in the stator is the magnet wire. The magnet wire must have a thin insulation wall to maximize slot fill, but must still be able to handle high voltage and high temperature.

The present application provides a high dielectric film material. The film can be used in ESP stators, for example for use in geothermal applications. The film can be used in various applications or locations in the ESP, for example, as or in the slot liner 783, as or in a phase barrier between magnet wire coils at the ends of the stator, and/or as or in a housing barrier external to the magnet wire coils and between the coils and housing at the ends of the stator. The film can advantageously improve the reliability of and increase power output from the ESP stator.

Existing films are typically polyimide tape, PEEK film, or fluoropolymer film. Polyimide tape has good dielectric strength, but poor thermal conductivity. It is also hygroscopic and prone to rapid decomposition in the presence of high temperature water. PEEK has improved resistance to water vs. polyimide but tends to have lower dielectric strength, particularly at high temperature. PEEK films also tend to distort and wrinkle when exposed to high temperature. Fluoropolymer films have excellent water and fluid resistance, but are prone to distortion at high temperature, and have lower breakdown strength compared to polyimide materials.

Dielectric films according to the present disclosure advantageously have improved properties compared to currently available materials. For example, when used as a slot liner, as the slot liner sits between the magnet wire and the metal of the stator lamination, improving heat dissipation in this location reduces heat buildup in the slots. Reducing the operating temperature of the primary wire insulation can effectively increase the lifetime, which is critical for high reliability applications.

Dielectric films according to the present disclosure include or are made of a polymeric matrix combined with an inorganic filler and/or reinforcing system. This composition can advantageously provide dimensional stability, lower CTE, and/or improved thermal conductivity. High amounts of filler can be incorporated into the polymer and/or a sheet of polymer can be laminated or permanently bonded to a sheet of glass or mica fabric. The filler can be selected to have a higher thermal conductivity and lower CTE than the polymer matrix. In some configurations, the filler is or includes one or more mineral and/or ceramic fillers. For example, the filler can be silica, which has good dielectric properties, lowest CTE, and satisfactory thermal conductivity. In some configurations, a filled polymer system is laminated to a reinforcing fabric material. The effective volume fraction of inorganic, thermally conductive element should exceed 15% of the total volume to provide an increase in overall thermal conductivity.

The polymer matrix can be a single material (e.g., PTFE, PFA, polyimide PEEK) or multiple materials sandwiched together to make a single film. In some configurations, the films, or layers of a film, are not physically or chemically bonded together prior to insertion into the stator. Instead, after being individually placed in the stator, the stator is encapsulated with a rigid thermoset resin that mechanically locks the films in place. Combining thin layers of multiple materials allows for combining advantageous properties of each individual potential material. For example, in some configurations, water resistant PTFE or PFA composites can form the outside of the film "sandwich," and a high dielectric strength polyimide or polyimide composite film is disposed inside the "sandwich" and protected from water ingress.

In some configurations, films according to the present disclosure are subjected to a surface treatment that provides improved compatibility with the thermoset resin encapsulant. Such a treatment advantageously promotes wettability and flow of the resin over and between the films, and ensures a strong bond at the interface of the materials. The compatibilizing surface treatment can help the encapsulating resin fully pack the slots 782, eliminating or minimizing voids.

In some configurations including several layers, the outermost film of the film "sandwich" is selected to be a very thin, low modulus film with a high strain at break. The low modulus, high elongation film provides a buffer between the thermoset encapsulant and the other film layers. This outer layer advantageously provides strain relief to the inside layers during thermal expansion and contraction of the encapsulant, thereby preventing or inhibiting crack propagation that may occur in the resin during extreme duty cycles, for example, due to difference in thermal expansion. Otherwise, such cracks could propagate through the slot liner films, creating a potential electrical failure path to ground. The low modulus, high elongation outer film can be disposed on both sides of one or more inner layers. Alternatively, the low modulus, high elongation outer film can be disposed on one side of the other layers. For example, for a slot liner 783 application, the low modulus, high elongation outer film can be disposed on the side of the slot liner which would encounter the most strain in use, likely the inside of the slot, or side of the slot liner 783 facing the magnet wire 792. An example of such a material for the outer layers is PFA-PG general purpose film available from Saint-Gobain. In some configurations, outer layer(s) of film could also include a compatibilizing surface treatment.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately," "about," "generally," and "substantially" may refer to an amount that is within less than 10% of, within less than 5% of, within less than 1% of, within less than 0.1% of, and/or within less than 0.01% of the stated amount. As another example, in certain embodiments, the terms "generally parallel" and "substantially parallel" or "generally perpendicular" and "substantially perpendicular" refer to a value, amount, or characteristic that departs from exactly parallel or perpendicular, respectively, by less than or equal to 15 degrees, 10 degrees, 5 degrees, 3 degrees, 1 degree, or 0.1 degree.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims. It is also contemplated that various combinations or sub-combinations of the specific features and aspects of the embodiments described may be made and still fall within the scope of the disclosure. It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above.

What is claimed is:

1. A dielectric film comprising:
   a polymeric matrix;
   an inorganic, thermally conductive filler; and
   a plurality of layers comprising:
      one or more outer layers comprising a water resistant material; and
      one or more inner layers comprising a high dielectric strength polyimide film or polyimide composite film, wherein:
         each layer of the plurality of layers is a film, and
         the one or more inner layers are sandwiched between the one or more outer layers such that the plurality of layers are configured to not physically or chemically bond together prior to insertion into an electric submersible pump motor stator.

2. The dielectric film of claim 1, wherein the plurality of layers are permanently bonded to a sheet comprising a reinforcing fabric.

3. The dielectric film of claim 1, wherein the inorganic, thermally conductive filler is present in an amount exceeding 15% total volume.

4. The dielectric film of claim 1, wherein the inorganic, thermally conductive filler comprises a mineral and/or a ceramic.

5. The dielectric film of claim 1, wherein the polymeric matrix comprises one or more of polytetrafluoroethylene (PTFE), perfluoroalkoxy (PFA), or polyether ether ketone (PEEK).

6. The dielectric film of claim 1, wherein the plurality of layers are configured to be locked in place in the electric submersible pump motor stator during encapsulation of the electric submersible pump motor stator with a rigid thermoset resin.

7. The dielectric film of claim 1, wherein the one or more outer layers comprise a water resistant polytetrafluoroethylene (PTFE) or perfluoroalkoxy (PFA) composite.

8. The dielectric film of claim 1, wherein the one or more outer layers comprise a low modulus, high elongation film.

9. The dielectric film of claim 1, further comprising a surface treatment configured to improve compatibility with thermoset resin encapsulant of the electric submersible pump motor stator.

10. The dielectric film of claim 1, further comprising a surface treatment configured to improve compatibility with thermoset resin encapsulant of the electric submersible pump motor stator.

11. A method of making a dielectric film, the method comprising:

forming one or more outer layers, wherein each outer layer comprises a water resistant material;

forming one or more inner layers, wherein each inner layer comprises a high dielectric strength polyimide film or polyimide composite film; and sandwiching together the one or more inner layers with the one or more outer layers wherein the one or more inner layers and the one or more outer layers are not physically or chemically bonded together prior to insertion into an electric submersible pump motor stator.

12. The method of claim 11, further comprising:

inserting the dielectric film into the electric submersible pump motor stator, and encapsulating the electric submersible pump motor stator with a rigid thermoset resin, such that the one or more outer layers and the one or more inner layers are mechanically locked in place.

13. The method of claim 11, further comprising:

incorporating an inorganic filler into a polymeric matrix of the dielectric film.

14. The method of claim 13, wherein the inorganic filler is incorporated into the polymeric matrix in an amount exceeding 15% total volume.

15. The dielectric film of claim 1, wherein the plurality of layers are permanently bonded to a sheet comprising glass.

16. The method of claim 11, further comprising applying a surface treatment to the dielectric film, the surface treatment configured to improve compatibility with a thermoset resin encapsulant of the electric submersible pump motor stator.

* * * * *